(No Model.) 2 Sheets—Sheet 1.

A. V. L. BEDOUT.
METER FOR ESTIMATING THE VOLUME AND DENSITY OF ALCOHOL, &c.

No. 513,293. Patented Jan. 23, 1894.

WITNESSES:
George Baumann
Edith J. Griswold

INVENTOR
Aimé Victor Louis Bedout
BY
Howson and Howson
his ATTORNEYS.

(No Model.) 2 Sheets—Sheet 2.
A. V. L. BEDOUT.
METER FOR ESTIMATING THE VOLUME AND DENSITY OF ALCOHOL, &c.
No. 513,293. Patented Jan. 23, 1894.
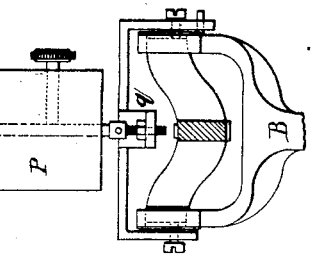
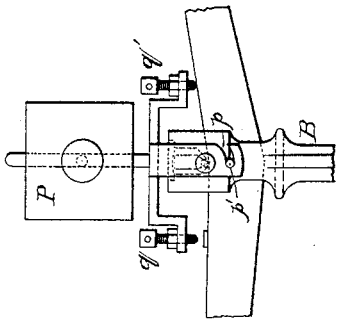
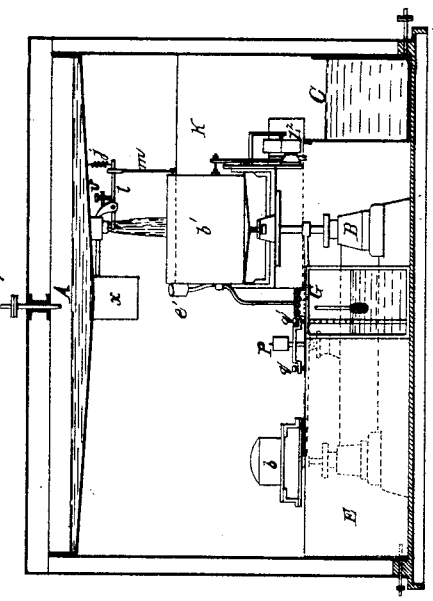
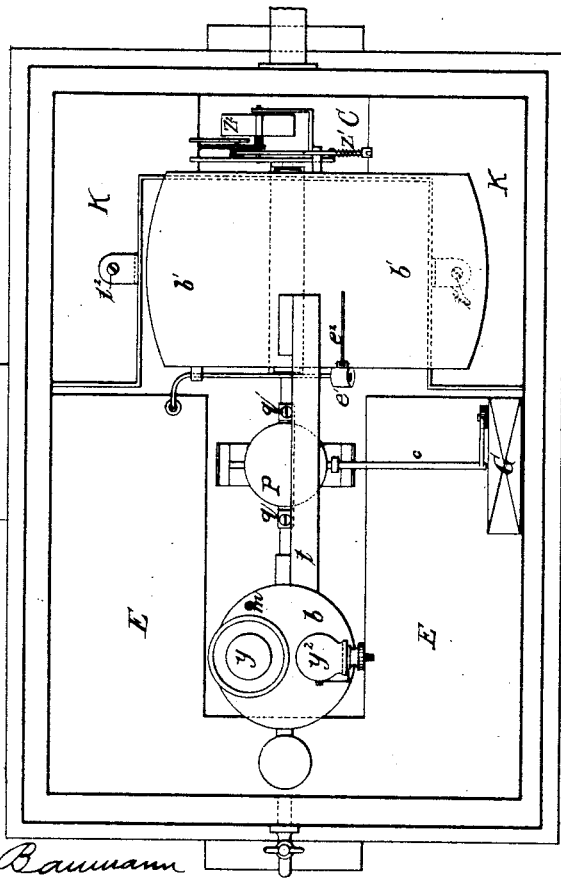
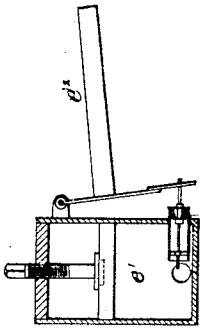
WITNESSES.
George Baumann
Edith J. Griswold
INVENTOR
Aimé Victor Louis Bedout
BY
Howson and Howson
his ATTORNEYS.

UNITED STATES PATENT OFFICE.

AIMÉ VICTOR LOUIS BEDOUT, OF CAZAUBON, FRANCE.

METER FOR ESTIMATING THE VOLUME AND DENSITY OF ALCOHOLS, &c.

SPECIFICATION forming part of Letters Patent No. 513,293, dated January 23, 1894.

Application filed June 2, 1893. Serial No. 476,408. (No model.) Patented in France March 16, 1892, No. 220,176; in Belgium April 29, 1892, No. 99,486; in England May 2, 1892, No. 8,272; in Germany May 7, 1892, No. 66,492; in Switzerland May 21, 1892, No. 5,097; in Spain June 7, 1892, No. 13,286; in Italy June 30, 1892, No. 31,791, and in Austria-Hungary October 29, 1892, No. 23,707.

*To all whom it may concern:*

Be it known that I, AIMÉ VICTOR LOUIS BEDOUT, distiller, a citizen of the Republic of France, residing in Cazaubon, (Gers,) France, have invented an Improved Meter for Estimating the Volume and Density of Alcohols and other Liquids, (for which I have obtained a patent in France March 16, 1892, No. 220,176; in Belgium April 29, 1892, No. 99,486; in Great Britain May 2, 1892, No. 8,272; in Germany May 7, 1892, No. 66,492; in Switzerland May 21, 1892, No. 5,097; in Spain June 7, 1892, No. 13,286; in Italy June 30, 1892, No. 31,791, and in Austria-Hungary October 29, 1892, No. 23,707,) of which the following is a specification.

My invention consists of an apparatus for measuring the volumes and the average densities of alcoholic liquids as they issue from an alembic or still and of liquids generally. The exactitude of the data or indications of this meter is the more certain in that it weighs the liquid by the liquid and suppresses, owing to the reduced volume of its receivers, the causes of errors which might result from the temperature and the very variable density of alcohols. Fitted to the feed pipe of the still, this meter gives the sum of the volume and the average density of the phlegms to be distilled. A second meter, placed at the outlet of the worm, permits the operator by the aid of a simple subtraction bearing upon the liquid reduced to pure alcohol, to know exactly the loss resulting from the distillation.

Figure 3:
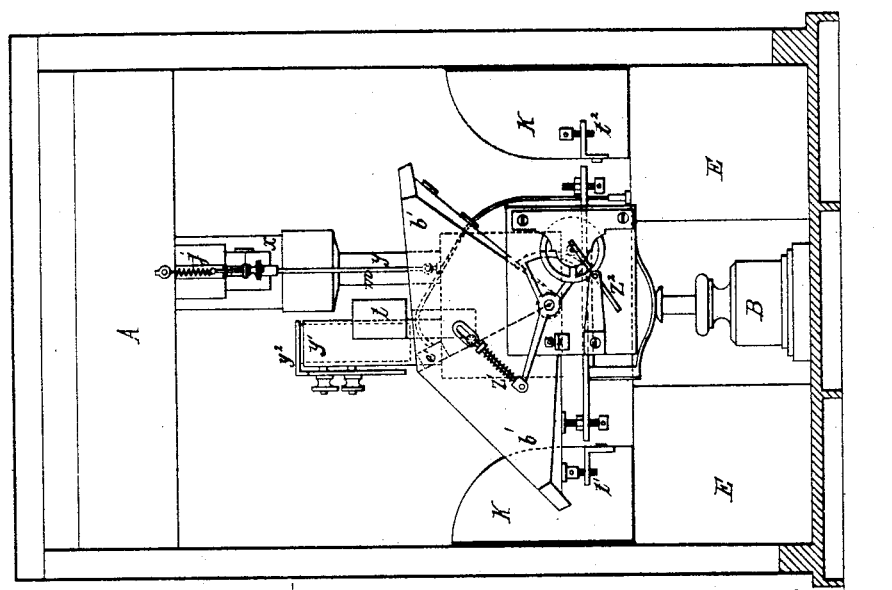
Figure 1:
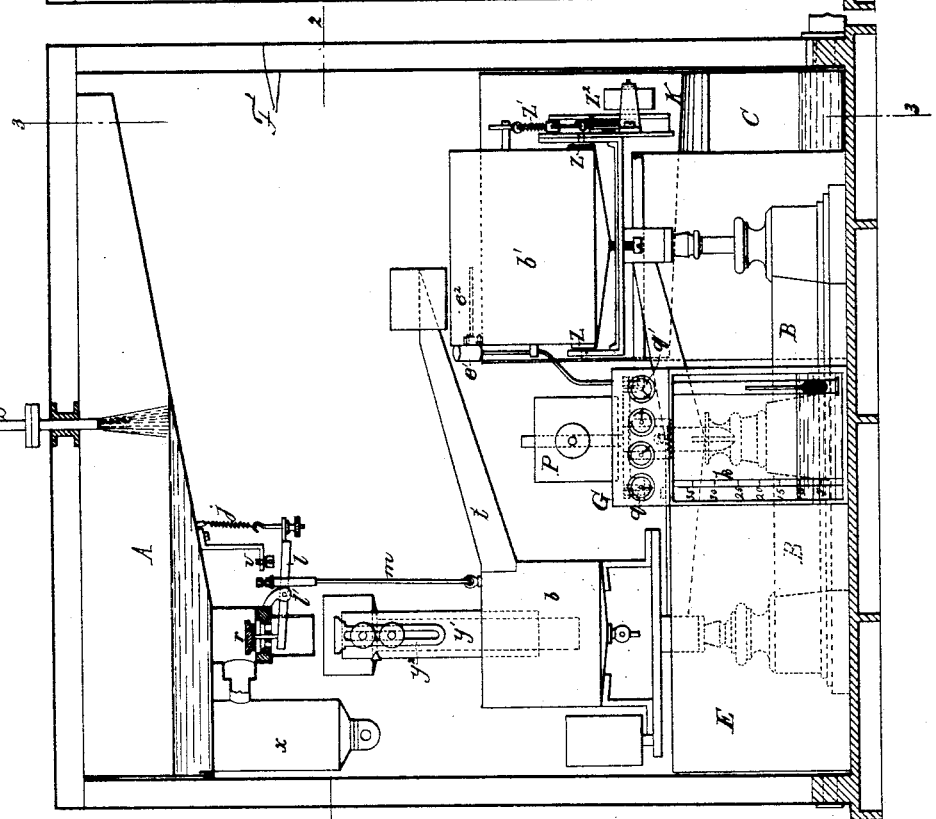

In the accompanying drawings, Figure 1 is a longitudinal section of a meter according to my invention. Fig. 2 is a horizontal section thereof, taken on the line 2—2 of Fig. 1. Fig. 3 is a transverse section taken on line 3—3 of Fig. 1, looking toward the balance B. Figs. 4, 5 and 6 are detail views hereinafter referred to, and Fig. 7 is a view similar to Fig. 1, representing a modification.

The meter thus represented is composed of three main parts. First, a distributing reservoir A of about sixty liters, into which the leaded orifice or worm S pours the alcohol; second, a "Robertsval" or "Beranger" balance or beam above the plates or scales of which are two vessels $b$ and $b'$ with their accessories; third, a basin or tank E perfectly isolated to avoid shocks which might modify its contents, carefully determined by the aid of fixed scales and which I term the "totalizer."

The distributing reservoir A with bottom inclined toward the outlet pipe is placed in communication with an inlet-tube provided with bolted fastenings or flanges which may be sealed with lead externally to prevent introduction of foreign substances to the product of the distillation.

The liquid supplied to the distributing reservoir A through the inlet tube S, passes through a filter $x$ and thence by an open valve $r$ into a vessel $b$. The valve $r$ is carried by one arm of a lever $l$, pivoted at $l'$, which lever, under the action of a spring $j$, tends to maintain the valve closed. The valve is pierced with small holes, assuring a slight flow of the liquid even when the valve is closed. The spring $j$ is always tensioned somewhat, even when the valve is closed as the arm $l$ abuts against a screw $v$. A rod $m$ fixed at one end to the upper part of the vessel $b$, and at the other end passing over the lever $l$, acts upon the lever to open or close the valve $r$ when the vessel $b$ is raised or lowered as hereinafter explained.

One plate of the balance-beam carries the vessel $b$ which is in the form of a short cylinder. This vessel $b$ is provided with two vertical tubes $y$ and $y'$ one of which,—$y$— is situated directly below the valve $r$ to receive the liquid to be measured, while the other one, $y'$, carries a piston which can be lowered more or less by means of the guide $y^2$ for the purpose of exactly proportioning the capacity of the vessel $b$. This vessel is provided with an oblique tube $t$ adapted to conduct the liquid from this vessel into the vessel $b'$, and is also provided with an emptying cock, in case of need. The vessel $b'$ is formed with two compartments open at the top, and turns on an axis $z$ carried by the other plate of the balance. It is connected by means of a rod $z'$, a sector and suitable gearing, to a fly-wheel $z^2$ which acts as a resistance and deadens the shock due to the turning of the vessel $b'$ in either direction. The wheels are supported by the balance plate. At each side of the vessel $b'$ is a funnel K, the two funnels being inclined toward a common receptacle C.

The balance beam is surmounted at its center by a weight P pivoted to the support of the beam, the center of oscillation being situated at its lower part as seen in the detail views Figs. 5 and 6. The weight is provided with two angle bars carrying screws in the plane, of the balance-beam and adjustable to allow a certain play between them and the upper part of the beam. A small rod $c$ connects the weight to a counting mechanism G (Figs. 1 and 2) adapted to register the number of weighings made. A pin $p$, projecting from the beam support, and working in a slot $p'$ of the weight, allows the weight P to turn to one side only—that is toward the vessel $b'$.

On one of the compartments of the vessel $b'$ is the gage chamber $e'$ consisting of a small reservoir communicating by means of a float-valve $e^2$, Fig. 4, with the interior of this compartment. When the compartment is full the float opens the valve and allows the chamber $e'$ to fill. A flexible tube leading from the chamber $e'$ is so arranged as to deliver the liquid contained in the chamber $e'$ into a totalizing reservoir E at the same time of the turning of the vessel $b'$. The capacity of the gage chamber $e'$ is determined and regulated by a small piston as shown in Fig. 4.

The totalizer is a reservoir E gaged previously by the aid of a fixed scale $k$ Fig. 1 which facilitates the reading through a glass plate placed in the face of the meter, beneath the clockwork movement G. This reservoir, containing say fifty liters for example, contains an alcohol meter and a thermometer and its outer orifice is closed by a cock sealed with a leaden or a wax seal or even secured by a padlock. The alcohol meter and the thermometer combined give the degree of the whole of the fifty liters which have been borrowed by constant quantities of one centiliter to a fraction of two to five liters. This degree will be the same as that of twenty thousand liters weighed. If we suppose the degree to be sixty-eight, the alembic will have distilled $20{,}000 \times .68 = 13{,}600$ liters of pure alcohol.

The clockwork movement G which registers say by five liters the passage of the liquid, should also indicate twenty thousand liters. It may therefore be said that this meter controls itself and preserves a faithful witness of its operations. The objection of the contraction arising from mixtures in quantity of alcoholic liquids is overcome, and the quantities being mixed in very small doses their combination could not, under this volume, give rise to this phenomenon.

The operation of the apparatus is as follows: Supposing the vessel $b$ to be full of liquid, and the valve $r$ wide open. The further supply of liquid admitted to the vessel $b$ passes through the pipe $t$ into the compartment of the vessel $b'$ which is uppermost and just below the outlet of the pipe $t$. When a sufficient quantity of liquid has passed into the vessel $b'$ to establish an equilibrium, the vessel $b$ rises, and through the medium of the rod $m$ and lever $l$ the valve $r$ is closed and only a small flow of liquid continues, through the openings in the valve. At the moment of perfect equilibrium the balance beam striking the screw $q$ rocks the weight P over against the end of the beam carrying the vessel $b'$, consequently lowering the vessel $b'$ which comes in contact with one or the other of two adjustably fixed abutments $t'$ or $t^2$ according to the compartment of the vessel which has been filled. This causes the vessel $b'$ to turn on its axis, and the contents of the filled compartment is emptied into the corresponding funnel. At the same time the other compartment is presented to the pipe $t$, and the same operation renewed, the weight of the liquid in the vessel $b$ lowering its end of the beam, opening the valve $r$, and restoring the weight P to its original position. The working of the apparatus may be continued indefinitely as long as there is a supply of liquid to be measured. At every other oscillation of the vessel $b'$ the gage chamber receives a determined quantity of liquid to be delivered to the totalizer as before described, and at each rocking of the weight P, the counter is actuated to register the number of weighings effected.

Fig. 5 represents a modification of the apparatus in which the vessel plate $b$ is replaced by a fixed weight, the operation remaining the same with the exception that the liquid runs directly into the vessel $b'$. In this case the apparatus totalizes the weights instead of totalizing the volumes, but knowing the mean density of the liquid by the gage chamber one can easily determine the volume.

I would observe that the working of this meter is not limited to the quantities taken as example, and that the capacity of the vessels $b$ and $b'$ is essentially variable. This capacity may be increased or lessened at will; the same applies to the gage chamber $e'$. It suffices, to obtain true calculations, to know the relations between the capacity of the gage chamber $e'$ and that of the dished plate or vessel $b$. Finally the apparatus in its entirety may take any form and dimensions. It is in every case, completed by a double casing of metal F' warding off shocks which might impair the contents or the proper working. All danger of explosion from alcoholic gases coming from the inlet S is avoided by metal gratings suitably placed to prevent any introduction of foreign substances into the still. Inspection openings are provided in the casing to follow the operation and sealed doors to give access to the working parts in case of necessity.

I claim as my invention—

1. A meter for measuring the density and volume of liquid comprising a balance beam, one end of which has a counterbalance and the other end is provided with a pivoted vessel divided into two compartments, means for supplying the liquid to the pivoted vessel, means for tilting the pivoted vessel at the moment of equilibrium to discharge the filled compartment and present the empty compartment to the liquid supply, a register and connections whereby the movements of the beam are transmitted to the register at each weighing, all substantially as set forth.

2. A meter for measuring the density and volume of liquids, comprising a balance beam one end of which has a counterbalance and the other end is provided with a pivoted vessel divided into two compartments, a pivoted weight adapted to be acted upon by the beam and a registering mechanism actuated by the movements of the said pivoted weight, all substantially as set forth.

3. A meter for measuring the density and volume of liquids, comprising a balance beam one end of which has a counterbalance and the other end is provided with a pivoted vessel divided into two compartments, a pivoted weight adapted to be tilted at the moment of equilibrium to throw weight onto the end of the beam carrying the pivoted vessel, abutments with which the said pivoted vessel comes in contact when descending to tilt the vessel, and a registering mechanism actuated by the pivoted weight, all substantially as and for the purposes set forth.

4. A meter for measuring the density and volume of liquids comprising a balance beam, one end of which has a counterbalance and the other end is provided with a pivoted vessel divided into two compartments, means for supplying the liquid to the said pivoted vessel, a valve controlling the said supply, means for actuating the said valve by the movements of the balance beam, means for tilting the said pivoted vessel at the moment of equilibrium of the beam, a register and connections whereby the movements of the beam are transmitted to the said register at each weighing, substantially as set forth.

5. A meter for measuring the density and volume of liquids comprising a balance beam, one end of which is provided with a vessel of predetermined capacity, a liquid supply to the said vessel, a spring actuated valve in the said supply, connections between the said vessel and the said valve for controlling the latter, the said vessel having an outlet at the top, the other end of the balance beam being provided with a pivoted vessel divided into two compartments adapted to alternately come beneath the said outlet from the first vessel, means for tilting the said pivoted vessel at the moment of equilibrium and registering mechanism adapted to be actuated by the movements of the balance beam, all substantially as and for the purposes set forth.

6. A meter for measuring the volume and density of liquids comprising a balance beam, one end of which has a counterbalance and the other end is provided with a pivoted vessel divided into two compartments, a small gage chamber communicating with one of the compartments, the communication being provided with a valve, a reservoir E, means for conveying the contents of the said gage chamber into the said reservoir when the compartment with which the chamber communicates is turned down, means for tilting the said vessel at the moment of equilibrium, a register and connections whereby the movements of the beam are transmitted to the said register at each weighing, all substantially as set forth.

In testimony whereof I have signed my name to this specification in the presence of two subscribing witnesses.

AIMÉ VICTOR LOUIS BEDOUT.

Witnesses:
LÉON FRANCKEN,
ROBT. M. HOOPER.